United States Patent [19]

Kruse

[11] Patent Number: 5,663,217
[45] Date of Patent: Sep. 2, 1997

[54] INK COMPOSITION

[75] Inventor: Jurgen M. Kruse, Tucson, Ariz.

[73] Assignee: XAAR Limited, Cambridge, England

[21] Appl. No.: 87,690

[22] PCT Filed: Jan. 10, 1992

[86] PCT No.: PCT/GB92/00055

§ 371 Date: Jul. 9, 1993

§ 102(e) Date: Jul. 9, 1993

[87] PCT Pub. No.: WO92/12209

PCT Pub. Date: Jul. 23, 1992

[30] Foreign Application Priority Data

Jan. 11, 1991 [GB] United Kingdom ............... 9100614

[51] Int. Cl.$^6$ .................................................. C09D 11/10
[52] U.S. Cl. ..................... 523/161; 524/524; 524/563; 524/594; 524/376; 260/DIG. 38; 106/31.37; 106/31.53; 106/31.58
[58] Field of Search .......................... 523/161; 524/524, 524/563, 376, 594; 106/20 D, 20 R, 26 R, 30 R; 260/DIG. 38

[56] References Cited

U.S. PATENT DOCUMENTS

| | | | |
|---|---|---|---|
| 3,687,887 | 8/1972 | Zabiak | 524/96 |
| 4,471,079 | 9/1984 | Enami | 523/161 |
| 4,567,213 | 1/1986 | Bhatia et al. | 523/160 |
| 4,880,432 | 11/1989 | Egan et al. | 8/647 |
| 5,010,125 | 4/1991 | Kruse et al. | 524/308 |
| 5,104,448 | 4/1992 | Kruse | 106/22 R |
| 5,112,398 | 5/1992 | Kruse | 106/20 D |
| 5,194,475 | 3/1993 | Kruse et al. | 524/308 |

FOREIGN PATENT DOCUMENTS

| | | |
|---|---|---|
| 386 349 A1 | 9/1990 | European Pat. Off. |
| 403 272 A1 | 12/1990 | European Pat. Off. |
| 408 333 A1 | 1/1991 | European Pat. Off. |
| OS 2 136 055 | 1/1972 | Germany. |
| OS 34 38 272 | 5/1985 | Germany. |
| 53-123210 | 10/1978 | Japan. |
| 59-207975 | 11/1984 | Japan. |
| 4-132773 | 5/1992 | Japan. |
| 4-132774 | 5/1992 | Japan. |
| 1603062 | 11/1981 | United Kingdom. |
| 2138834 | 10/1984 | United Kingdom. |

OTHER PUBLICATIONS

"Acryloid® DM–55, Solid–Grade Resin for Pigment Dispersion"; Rohm and Haas Company; (4 pages) (U.S.A., Jul. 1987).
"Anti–Terra®—204, Wetting and Dispersin Additive against Sagging, Sedimentation and Flooding"; BYK–Chemie GmbH; (2 pages) (Germany, Oct. 1990).
"Anti–Terra®—207, Wetting and Dispersing Additive to Improve Pigment Wetting and Anti–Sedimentation"; BYK–Chemie GmbH; (2 pages) (Germany, Jul. 1991).
"Anti–Terra®—P, Wetting and Dispersing Additive against Settling and Flooding"; BYK–chemie GmbH; (2 pages) (Germany, Oct. 1990).
"Disperbyk®—101, Wetting and Dispersing Additive"; BYK–Chemie GmbH; (2 pages) (Germany, Oct. 1990).
"Disperbyk®—110, Wetting and Dispersing Additive"; BYK–Chemie GmbH; (2 pages) (Germany, Mar. 1990).
"Disperbyk®—130, Wetting and Dispersing Additive"; BYK–Chemie GmBH; (2 pages) (Germany, Oct. 1990).
"Disperbyk®—160/Disperbyk®—162/Disperbyk®—163, Wetting and Dispersing Additives for Organic and Inorganic Pigments"; BYK–Chemie GmbH; (4 pages) (Germany, not dated).
"Disperbyk®—164, Wetting and Dispersing Additive for Organic and Inorganic Pigments"; BYK–Chemie GmbH; (2 pages) (Germany, Oct. 1991).
"Disperbyk®—166, Wetting and Dispersing Additive for Organic Pigments"; BYK–Chemie GmbH; (2 pages) (Germany, Oct. 1990).
"EFKA®—47 E.A."; EFKA Chemicals B.V.; (2 pages) (Holland, Aug. 1991).
"Elvacite AB Dispersants"; E.I. duPont de Nemours; (8 pages) (Belgium, May 1990).

Primary Examiner—Paul R. Michl
Assistant Examiner—John J. Guarriello
Attorney, Agent, or Firm—Marshall, O'Toole, Gerstein, Murray & Borun

[57] ABSTRACT

An ink jet ink especially for printing on to plain paper comprises a suspension in (a) non aqueous solvent of (b) a disperse phase comprising: (i)) a water-insoluble dyestuff which is insoluble in said solvent at the ink jet operating temperature and below; (ii) a water insoluble resinous dispersant for the dyestuff which in the amount used is capable of forming a solution in the said solvent at the ink jet operating temperature, (iii) a polymer binder to hold the dyestuff on the surface of the paper.

22 Claims, No Drawings

INK COMPOSITION

This invention relates to ink compositions and more particularly to ink compositions for printing on plain paper using an ink jet printer, and a method of ink jet printing on paper. The invention is especially concerned with compositions suitable for use as inks in so-called "drop-on-demand" ink jet printers.

In ink jet printing, a fluid ink is forced under pressure, and sometimes at elevated temperature, through a very small nozzle in a printing head.

In one kind of printer, known as a "continuous" printer, ink droplets which are produced continuously are passed through a charging area where individual droplets receive an electrical charge in response to a signal and are directed towards a substrate to be printed. The droplets pass through an electrical field causing them to be deflected by an amount which is dependent on the intensity of the charge and the field. Droplets not required to form print on the substrate are directed to a by-pass gutter. Inks for use in such printers need to be conductive.

In another kind of printer, known as a "drop-on-demand" (DOD) printer, the ink droplets are expelled from the nozzle of a print head only when required during the printing process. Drop-on-demand printers can use an electrostatically accelerated ink jet or droplet sequences ejected by pressure impulse actuation. In the latter kind of DOD printer, each drop of ink is individually ejected from a nozzle by means of pressure pulses induced e.g. by use of a piezoelectric actuator acting on the ink in the channel supplying the nozzle or by generation of a vapour bubble in response to a thermal pulse. Inks for use in this kind of printer do not need to be electrically conductive and preferably are non-ionic and of very low conductivity, e.g. having a resistivity of at least $10^6$ ohm cm.

In ink jet printers which employ piezo-electric actuators having electrodes in direct contact with the ink it is important that the ink is free of components which would cause bubble generation or electrochemical removal of the electrodes.

EP-A-0386349 describes an ink specifically developed for use in DOD ink jet printers and comprising a solution of a dye in a solvent. However, while these inks are successful on certain coated papers they are not entirely appropriate for plain papers due to wicking of colorant along the fibres and through the paper thickness.

As the coated papers are expensive, it is now generally accepted that ink jet printer inks should be capable of producing well-defined print of good colour density on plain, i.e. uncoated, paper substrates.

Good print definition quality requires inter alia (a) rapid formation of a solid colored dot from the ink composition, (b) concentration of the ink colorants on the surface of the paper (c) control of the spread of the dot of colour formed on the surface of the paper substrate from the ink droplet, and (d) uniformity of colour and colour density over the area of the solid dot formed from the droplet. Preferably, also, the print should not deteriorate as a result of the action of water or light.

It is also important, especially when it is intended for use in a DOD ink jet printer, that the ink be stable on standing or storage; not become concentrated by loss of solvent or form aggregates in the nozzle or at the orifice of the nozzle because this could lead to clogging of the nozzle itself or of the channel supplying the nozzle; and not form deposits around the periphery of the nozzle orifice during drop ejection.

In the ink droplet, the colour-generating component, or dyestuff, is generally associated with a liquid carrier, alternatively referred to as a solvent. Thus, rapid formation of the solid dot requires either rapid solidification of the solvent or rapid removal of the solvent from the colour dot on the paper, e.g. by rapid sorption of the solvent into the paper.

One proposal for a suitable ink composition for a DOD ink jet printer has involved the use of dyestuffs which are precipitated from solution in the solvent on contacting the substrate surface as a result of a change in pH of the dyestuff effected by reaction thereof with the substrate. However, this limits the choice of dyestuff and also involves the use of special papers.

An alternative approach has been the development of inks employing as the carrier a substance which is solid at room temperature. The inks are used as hot melts and solidification is achieved by cooling. However, such inks require expensive energy to convert them to the molten state and relatively large energy requirements to eject the drops from the printhead due to their high viscosity even when molten.

Another approach, described in our co-pending EP-A-0403272, has involved developing an ink comprising a dispersion of dyestuff in a solvent containing a polymeric component which is soluble in the solvent when warm but insoluble at room temperature. With these inks, formation of the solid dot relies on precipitation of the polymer and dyestuff from the solvent on contact of the ink droplet with the cold substrate surface or during its trajectory from the printhead. While these inks to not require operating temperatures as high as the hot melt inks, they still require the use of heated printheads.

The formulation of inks comprising a dispersion of dyestuff in a solvent for use in ink jet printers presents inherently conflicting requirements. For example, while it is desirable for the solvent to have a low volatility so as to minimise the risk of evaporation in the printhead nozzle, the rate at which the print dries can be enhanced by increasing the volatility of the solvent. Furthermore, for use on uncoated papers, it will be understood that if the dyestuff particles are too small, their tendency to pass through the interstices between the fibres forming the surface of the paper will increase, thereby reducing one or both of colour density and print definition. On the other hand, increasing the particle size will tend to increase the difficulty of achieving a stable dispersion, and the risk of clogging the nozzle, especially in DOD printers where the ink is held for long periods in the nozzle when that nozzle is inactivated.

A further problem is that of the viscosity of the ink because while a low viscosity is required to assist ink flow in the passages in the print head and ejection of the droplets from the print head, lowering the viscosity will generally increase the rate at which the droplet will spread over the paper surface and into the pores of the paper.

Even if these conflicting requirements are resolved satisfactorily, there remains the problem of achieving an acceptable colour density at a level of concentration of dye in the ink which can be maintained as a stable dispersion and with the ink having an acceptably low viscosity.

Our copending European patent application 90307571.1, published as EP-A-0408333, describes a plain paper ink formulation comprising a non-aqueous solvent and, dispersed therein, an amount of resin which is capable of forming a solution in said solvent at a temperature in the range of 20° to 35° C., a dyestuff which at said temperature is bound to or soluble in said resin but substantially insoluble in the solvent, and optionally a suspending agent such as a glycerol monoester, phosphate ester, fatty acid polyamine or nonylphenoxy poly (ethylenoxy) ethanol. The purpose of the resin is to bind the dyestuff to the cellulose of the paper and the purpose of the suspending agent is to keep the particles of the dyestuff and resin from settling out of solution or from coagulation.

While the effect of the resin in bonding the dyestuff particles to the cellulose of the paper improves the effective colour for a given concentration of a given dyestuff, still further improvement in the optical density of the print at acceptable ink viscosities would be desirable. Increasing the concentration of dyestuff, however, increases the viscosity.

The above mentioned problems are reduced or resolved and print of improved optical density at acceptable ink viscosities is achievable by the fluid ink composition of the present invention which comprises a suspension in (a) a non aqueous solvent of (b) a disperse phase comprising:

(i) a water-insoluble dyestuff which is insoluble in said solvent at the ink jet operating temperature and below;

(ii) a water-insoluble resinous dispersant for the dyestuff which in the amount used is capable of forming a solution in the said solvent at the ink jet operating temperature; and (iii) a polymeric binder to hold the dyestuff on the surface of the paper.

The ink of the present invention includes a disperse phase in which the dyestuff is associated with the resinous dispersant and the binder. As the tendency in ink jet printers is towards reduction in the nozzle size to as to improve printing definition and nozzle diameters of less than 50 μm or even less than 20 μm are contemplated, it becomes increasingly important not only that the dispersion is substantially stable but also that the particles are well dispersed, with a minimum of agglomeration. By means of the present invention, an ink is provided wherein the disperse phase is both well dispersed and substantially stable against precipitation and settling such that in ink jet printers of the kind described the ink will perform substantially as a uniform liquid.

When a drop of the ink is deposited on the surface of a paper substrate, the disperse phase comprising dyestuff, dispersant and binder separates from the solvent and becomes concentrated adjacent the paper surface while the solvent diffuses into the body of the paper. Aggregates of particles of the disperse phase form which tend to block the pores of the paper and hold the solids on the paper surface thereby forming the colour dot and fixing the dyestuff in the dot to the surface of the paper.

Thus, it is possible to employ the dyestuff in the form of particles which are sufficiently small for the ink to behave effectively as a liquid during drop ejection in a DOD ink jet printer and yet to achieve well defined print of good colour density. The ink is characterised by low viscosity at the shear rate effective during drop injection from the nozzle without risk of unacceptable spread of the colour content of the droplet over the paper surface.

In a preferred embodiment of the invention, the phase separation is assisted where the disperse phase comprising the combination of dyestuff, binder and dispersant is precipitated from the chosen solvent by contact with plain paper, e.g. due to the action of surface size or moisture present in the paper or due to the concentration effect caused by absorption of the solvent with the body of the paper. A test for one suitable form of this preferred embodiment of the ink is for the disperse phase of the ink to be precipitated by contact of the ink with water.

Volatilisation of the solvent is not essential for rapid drying of the dot since solvent removal may be achieved in other ways, e.g. by absorption into the substrate.

Also, as the dyestuff is insoluble in the solvent and remains associated with the dispersant and binder, it is not absorbed into the paper with the solvent and is substantially inhibited from spreading laterally over or through the paper fibres. Thus the colour content of the dyestuff is concentrated on the paper surface in the solid dot.

Furthermore, it has been found unexpectedly that the combination of the resinous dispersant and binder produces a print having a very good colour density at a lower dyestuff concentration, and hence lower viscosity, than would otherwise be required. In some cases, the colour density of print obtained from ink of the present invention matches those currently obtainable with offset printing, namely optical densities of as high as 1.6 as measured with a Macbeth reflection densitometer. Without wishing to be bound by this theory, it is believed that this is due to the fact that the unique combination of resinous dispersant and binder fills the pores between the fibres, so holding dyestuff on the surface, and limits dot spread, i.e. the tendency of the ink drops to spread after being deposited on the substrate surface.

By means of the present invention, therefore, inks are obtainable which have a viscosity which is low enough for ink jet printing, even on DOD ink jet printers, and have an acceptably low volatility and which are stable on storage and yet which are capable of producing print of high definition and colour density on plain paper.

Preferably, the ink composition exhibits shear thinning; that is, its viscosity is reduced with increase in shear rate.

The various components of the inks will not be discussed in greater detail.

THE SOLVENT

The solvent should be selected to form a low viscosity dispersion with the selected dyestuff, resin and binder.

While any low viscosity solvent may be used in which the dyestuff is insoluble but in which the chosen dispersant is capable of forming a solution in the amount employed, it is preferred that it combines a low volatility with the low viscosity.

While the surface tension of the solvent should not be too high because this could on the one hand retard diffusion into the paper fibres and on the other hand interfere with the ejection of the ink from the nozzle in the preferred case where the ink is intended for use in a pressure wave actuated ink jet printer, the surface tension should not be too low because otherwise the separation of the drop ligament from the nozzle is impeded during drop ejection.

Preferably the relative evaporation rate of the solvent is less than 0.1, more preferably less than 0.05 (butyl acetate= 1.0) at 25° C. and atmospheric pressure, and the viscosity is not more than 20 cps, more preferably not more than 15 cps and most preferably not more than 10 cps at 25° C. when measured on a Brookfield LV Viscometer with a No. 1 spindle and at a shear rate in the range of 8 $sec^{-1}$ to 80 $sec^{-1}$. Most preferably the viscosity of the solvent is not more than 10 cps and preferably not more than 6 cps at the operating temperature.

The surface tension of the solvent will preferably be in the range 27 to 32 dynes/cm at 25° C. and the boiling point is preferably greater than 150° C., and more preferably greater than 180° C., at atmospheric pressure.

The solvent may comprise a single component or a mixture.

Solvents which are particularly preferred because they are also readily absorbable into cellulosic fibres, and therefore do not have to rely on their volatility for removal from a dot printed on a paper substrate, are either of alkylene glycols and ethers of polyalkylene glycols. Specific examples include polypropylene glycol ethers and n-butyl ethers of ethylene glycol and poly(ethylene) glycol, especially the ethers of di- and tri-propylene glycol and the n-butyl ethers of diethylene glycol and triethylene glycol. Particularly preferred are the monomethyl ethers of di- and tripropylene glycol and the mono-n-butyl ethers of diethylene glycol and triethylene glycol.

Preferably, the solvent consists primarily or essentially of such a glycol ether or a mixture of such glycol ethers. That is, the ether or ethers will normally form at least 75% by weight, preferably at least 90% by weight, of the solvent.

By "non-aqueous" is meant that the solvent contains no more than about 5% by weight of water, including moisture absorbed from the atmosphere. Preferably, the solvent is free of any added water and it is also preferred that the solvent is such that the amount of moisture it is capable of absorbing from the atmosphere under normal operating or ambient conditions is less than 4%, and more preferably less than 2%, by weight. This is because in one preferred embodiment of the invention, the combination of dispersant, binder and dyestuff is chosen to be precipitatable from the chosen solvent by contact with water, e.g. by contacting a drop of the ink with a wet surface.

THE DYESTUFF

The dyestuff (which term may include certain pigments such as carbon black) is selected to be both water-insoluble and insoluble in the chosen solvent at the chosen operating temperature and below but such that the combination thereof with the resinous dispersant and binder forms a substantially stable dispersion in the solvent at the chosen operating temperature and below. A wide variety of dyestuffs is useful and in general the preferred dyes are found amongst those characterised as "pigment dyes" in The Colour Index.

Preferably the dyestuff will be of a primary subtractive hue. The dyestuff should be lightface, and thermally stable even with repeated warming. The dyestuff should be water insoluble once applied to the substrate to prevent smearing upon contact with water-containing substances.

Dyestuffs which have been found to be useful include Pigment Green 7, Pigment Blue 15, Pigment Yellow 17, Pigment Yellow 83, Pigment Yellow 12, Pigment Black 2, Pigment Black 5, Pigment Black 7, Pigment Red 17, Pigment Red 23, Pigment Red 57 and Pigment Red 112 and the Ciba Geigy Microlith Series with includes Black, Red, Blue, Green, and Gold. Pigment Blue 15-6, Pigment Yellow 17 and Pigment Red 23 are the preferred dyestuffs.

Other useful dyestuffs include Cyan Blue BNF, Imperial Sacandaga Yellow and Lithol Rubine. These dyestuffs are especially suitable in combination with the preferred solvents, resin dispersants and polymer binders.

Additionally, certain carbon blacks are useful as pigments in the invention. Preferred carbon blacks are Continex N234 or N330 carbon black from Witch Chemical Corp, Regal 250R from Cabot Carbon and Chevron acetylene black.

Mixtures of dyestuffs may be used.

It is a feature of the invention that good print definition and colour density are obtained even where the dyestuff particles are small enough to pass through the interstices between fibres of the surface of a paper substrate. Thus the particle size of the dyestuff may be 1.5 μm or less and is preferably not greater than 1.0 μm, more preferably not greater than 0.5 μm, still more preferably not greater than 0.3 μm.

It is also preferred that the specific gravity of the dyestuff is close to that of the chosen solvent since this reduces the likelihood of precipitation on standing.

THE RESINOUS DISPERSANT

The resinous dispersant is selected to be capable of forming a solution in the chosen solvent at the operating temperature and in the concentration in which it is employed in the ink, and to disperse the chosen dyestuff in the solvent so as to form a substantially stable dispersion. The dispersant should also be optically clear and preferably will adhere well to a paper substrate since then it can also contribute to binding the dyestuff to the paper substrate. Preferably the dispersant is capable of forming a solution in the solvent at room temperature as well as at the operating temperature if the latter is above room temperature.

By "capable of forming a solution", as this term is used here and in the discussion of the binder, we mean that the substance either dissolves in the solvent or is so highly solvated by it that the result is substantially indistinguishable from a true solution under the conditions employed in ink jet printers of the kind having nozzle diameters of about 20 μm to 50 μm or smaller.

The resinous dispersant must also be insoluble in water. Preferably it is chosen such that the disperse phase comprising the combination of the dispersant, the chosen binder and the chosen dyestuff will separate from the solvent when a droplet of the ink comes into contact with plain paper, e.g. due to action of the water and/or surface size, e.g. clay, in the paper or because of the concentration effect caused by absorption of the solvent into the paper. A convenient test for a suitable dispersant is to determine whether it is precipitated from a solution thereof in the desired concentration in the chosen solvent when the solution is contacted with plain paper or with water. Thus, while the dispersant must be soluble in the chosen solvent, and should also be soluble in mixtures of the solvent and small quantities of water such as may be absorbed from the atmosphere on standing, in one embodiment of the invention it is chosen such that it separates from the solvent on addition of a larger concentration of water. Such water sensitivity reduces still further the risk of undesired dot spread.

The dispersant may comprise a single component or a mixture.

Examples of resin classes from which suitable resinous dispersants may be chosen are natural resins such as alcohol soluble gums, synthetic analogues of natural resins such as synthetic rosin esters and alcohol-soluble polysaccharides, and acrylic resins. Examples of suitable natural resins include gums, Kauri, Copal, Mastic and Sandarac. Examples of synthetic analogues of natural resins include synthetic rosin esters such as those sold as "Beckacite®" by Reichhold. Other examples are cellulose esters, e.g. cellulose acetate propionate and cellulose acetate butyrate; hydroxyalkyl celluloses and dispersants sold by BYK Chimie of Germany under the trade names Anti-Terra® 204, 207 and P and Disperbyk®, dispersants sold by Efka Chemicals BV of Holland under the tradename "Efka", dispersants sold by ICI under the tradename Solsperse® and AB dispersants sold by DuPont under the tradename "Elvacite®". It will be understood, however, that not all resins within the classes listed are necessarily dispersants for all combinations of dyestuffs, solvents and binders.

Preferred resinous dispersants give a solution in the chosen solvent which, at the concentration of the dispersant employed in the ink, has a viscosity not very much greater than that of the solvent alone.

Preferably, the viscosity of the solution of the dispersant in the solvent is not greater than 15 cps.

Very good results are obtained with "Beckacite®" synthetic rosin esters and with thermoplastic acrylic-based resins such as Acryloid® DM-55, (also known as Paraloid® DM 55), marketed by Rohm and Haas.

THE BINDER

The binder is chosen to form a uniform coating on, and adhere well to, the chosen substrate, especially cellulose fibres, should be optically clear and should hold the selected dyestuff on the substrate surface under ambient conditions. Preferably, the binder is such that it not only coast cellulose fibres but also bridges interstices between cellulose fibres on a paper surface. In the ink composition, the binder should associate with the disperse phase and in that sense must be compatible with the resinous dispersant.

It is not essential for the binder to be soluble in the solvent at ambient temperature. Indeed, in one form it is preferred that in the amount in which it is used in the ink it is insoluble or substantially insoluble at ambient temperature but is at least partly, and preferably entirely or substantially entirely, soluble at elevated temperature; for example having a cloud point just above room temperature (e.g. in the range 25° to 50° C.). The use of such binders provides further control of dot spread and favours good dot formation.

Where the ink jet printer operating temperature is above ambient temperature, it is preferred that the binder is at least partly in solution in the solvent at said operating temperature but is insoluble or substantially insoluble in the solvent at room temperature, thereby allowing the use of the temperature range to assist control of dot spread.

Alternatively or additionally, it is preferred that the binder be such that the disperse phase containing the binder, the chosen dispersant and the chosen dye separates from the solvent when a droplet of the dispersion contacts a plain paper surface, e.g. due to action of water or size in the paper.

A single polymer or a mixture of polymers may be used as the binder.

Ethylene/vinyl acetate copolymers are particularly preferred as binder materials because they have been found to increase the water sensitivity of the acrylic resins preferred for use as the resinous dispersant and thus increase the rate at which the disperse phase is precipitated from solution on contact with water and thereby further limit dot spread when the ink droplet lands on a paper surface.

Examples of suitable ethylene/vinyl acetate copolymers are those sold as Vynathene® by quantum and those sold as Elvax® by Du Pont, and containing at least about 40% vinyl acetate by weight. In general, increasing the ethylene content of the copolymer increases the viscosity of the ink and limits the solubility of the copolymer in the preferred solvents even at elevated temperatures and thus those with a vinyl acetate content of about 40 to 50% by weight are preferred. Inks obtained with ethylene/vinyl acetate copolymers having these concentrations of vinyl acetate in the preferred polypropylene or polyethylene-glycol ether solvents also tend to have desirable non-Newtonian properties, exhibiting a relatively high viscosity e.g. 50 cps or more at relatively low shear rates but a much reduced viscosity at relatively high shear rates, e.g. $10^4$ $sec^{-1}$ and above, even approaching the viscosity of the solvent in some cases. The high viscosity at low shear helps to keep the dyestuff in suspension when the ink is being stored whereas the low viscosity at high shear reduces the energy required to eject the ink drop from the printhead.

Other resins which may be employed as binders include carboxylated acrylic resins such as those marketed as "Surcol" by Allied Colloids; amino resins, e.g. melamine, urea and benzoguanamino-based resins, such as those marketed under the tradename "Beetle" by British Industrial Plastics Limited; polyvinyl butyrals, phenolics, nitrocellulose and polyisobutylene. It will be understood that not all resins within these classes will necessarily be suitable with all combinations of dyestuff, dispersant and solvent.

The effect of the binder is to hold the dyestuff on the surface and contain dot spread thus enabling print of higher optical density to be achieved for a given concentration of dyestuff. Alternatively, it enables the same level of optical density to be achieved at a lower dyestuff concentration, thereby enabling a reduction in the viscosity of the ink. For example, replacing part of the dyestuff with the same weight of preferred ethylene/vinyl acetate copolymer increases optical density.

PROPORTIONS OF INGREDIENTS

The concentrations of the various components in the ink may be varied to suit particular requirements and end uses.

The amount of dispersant required will depend upon the choice of the solvent and dyestuff and also the particle size of the dyestuff. If too little is used, dispersion will be incomplete or the resultant dispersion will be unstable. However, there is a concentration of dispersant above which no further dispersive effect will be obtained. This level of concentration is that at which the viscosity of the dispersion of chosen dye and dispersant in the selected solvent is a minimum. Nevertheless, in the case of some resinous dispersants, it has been found that if the dispersant is included in an amount in excess of the level of concentration that yields the minimum viscosity, the excess can act as, or as part of, the binder.

Accordingly, it will be understood that the resin chosen as the dispersant may in some circumstances also act as a binder where it is employed in an amount in excess of that at which the viscosity of the combination of solvent, dye and resin reaches a minimum.

The amount of dispersant that gives the minimum viscosity for a particular composition of dye and solvent may be determined by measuring the viscosities of a number of such compositions containing the dispersant in varying concentrations and plotting a graph of measured viscosity against concentration of dispersant.

It is likewise believed that in some cases, the resin chosen as the binder may also assist dispersion. It may also assist in stabilizing the dispersion against settling.

The amount of dispersant employed will depend upon the nature, particle size and concentration of the dyestuff and will generally be in the range of 1–5 parts per part of dyestuff, by weight. In general, where the resin is selected from natural resins and acrylics it will be employed as a dispersant in an amount of from about 2 to about 12% of the total weight of the ink. Within this range, the amount will generally be in the range 2 to 8% for reds, yellows and blues but higher amounts, e.g. 4 to 10%, may be required for carbon black. If lower amounts are used, an adequate dispersive effect may not be achieved. However, where it is desired for the same resin to act also as, or as part of, the binder, larger amounts may be employed. Where a mixture of ethylene/vinyl acetate copolymer and acrylic resin or natural resin is employed as the dispersant, as a general rule of thumb it can be said that 1 part of the copolymer may replace 2 parts of natural resin or acrylic, by weight.

However, the amount of dyestuff that may be included in the ink at the same viscosity is increased with increase in the ratio of natural resin or acrylic to ethylene/vinyl acetate copolymer in the dispersant.

If the binder concentration is below about 1%, optical density may be adversely affected e.g. due to fibre showthrough. The maximum amount of binder that may be employed is generally controlled by viscosity considerations since increasing the amount of binder generally increases the viscosity of the ink, although the size of the increase depends to some extent on the nature of the binder. In general, therefore, it will be undesirable to use more than 4% although larger amounts, even up to 10%, may be acceptable in some cases.

Thus the total amount of resin employed in the ink as dispersant and as binder will generally be in the range of 3 to 16% by weight of the ink.

The amount of dyestuff employed will normally be in the range 2 to 5% by weight of the ink although larger or smaller amounts may be used if desired. It is a feature of the present invention, however, that even at these low levels of concentration, print of excellent colour density is achievable. Colour densities of up to as high as 1.6 are achievable with the darker colours such as magenta, red, blue and black.

Preferably, the solvent forms at least 80% of the ink composition, more preferably 95 to 83%, by weight. For most formulations, the solvent will form 93% to 84% by weight of the ink composition.

It will be understood that the ink composition may also include further components conventionally employed in inks, e.g. surfactants, drag-reducers, etc.

Whereas inks according to the invention may be formulated for operation at ambient conditions, they may also be employed at elevated temperatures. Operation at a moderately elevated temperature, e.g. 30° to 60° C., preferably 50° to 55° C., has the advantage of permitting greater control over operating conditions without being hazardous.

Where the inks are intended for use at such elevated temperatures, it will be understood that somewhat higher concentrations of dye, dispersant and/or binder may be employed or alternatively the viscosity of the ink at the operating temperature may be lower, thereby reducing energy requirements and permitting the use of lower actuation voltages and less expensive drive circuits.

Print with very good definition and colour density is obtainable from the use of inks according to the invention in ink jet printers. In particular, the dot spread is low, especially where the dispersant is a natural resin or acrylic resin, and the colour density is higher than that normally obtainable with the same concentration of dyestuff in the absence of the binder.

Inks according to the invention may be prepared by any suitable process. In one method, the binder, dispersant and dyestuff are dispersed in a small amount of solvent, e.g. by milling, and the resultant concentrated dispersion is then let down to the required concentration by addition of more solvent.

The invention is illustrated by the following Examples in which TPM means tripropylene glycol monomethyl ether.

Acryloid® DM 55 (also marketed as Paraloid® DM 55) is an acrylic copolymer marketed by Rohm and Haas.

Elvax 170 and Elvax 40-W are ethylene/vinyl acetate copolymers marketed by Du Pont.

Elvacite 2013 is an acrylic resin marketed by Du Pont.

Vynathene 90500 is an ethylene/vinyl acetate copolymer marketed by Quantum.

Beckacite is a synthetic resin ester sold by Reichhold.

Efka 47EA is resinous dispersant sold by Efka Chemicals BV of Holland.

All the colorants used in the following Examples had particle sizes of 0.5 μm or less and in all the Examples, the solvent was carefully dried before use.

EXAMPLE 1

3 g of Acryloid DM-55 were dissolved in 20 ml of warm (50°–60° C.) water-free TPM by stirring for 30 minutes. To this solution was added 2 g of Heliogen Blue L-6700 (BASF) and the resultant mixture stirred for 4 hours at 60° C. The dispersion so obtained was then allowed to cool to room temperature while stirring over a period of 45 minutes, then reheated to 60° C. to form slurry 'A'.

0.3 g Vynathene 90500 and 0.8 g ELVAX 170 were slurried in 10 ml TPM at 120° C. After 24 hours the hazy solution so obtained was allowed to cool to 60° C. and was then added over a period of 10 minutes to slurry 'A'. The mixture was stirred for a further 16 hours, then diluted to 70 ml with dry TPM.

The resultant ink had a viscosity of 250 to 150 cps at shear rates of 8 to 80 $sec^{-1}$, gave good dots on paper and was stable, meaning that no signs of sedimentation or settling were observed, even after several months.

EXAMPLE 2

3 g Acryloid DM-55 were dissolved in 20 ml warm (50°–60° C.) TPM by stirring for 1 hour. 1.75 Cromophtal yellow 8G (Ciba-Geigy) was added to this solution and the whole stirred at about 55° C. for 4 hours. The dispersion so obtained was then allowed to cool to room temperature and stirred for 1 hour before reheating to 55° C. To this dispersion was added a warm solution obtained by dissolving 1 g ELVAX 40-W in 10 ml TMP 120° C. over 3 hours and then allowing it to cool to 60° C. The resultant slurry was stirred for 72 hours and then let down to 50 ml with dry TPM.

The resultant ink was stable, gave very good dots on bond paper and had a viscosity of 50 to 30 cps as the shear rate was increased from 8 to 80 $sec^{-1}$.

EXAMPLE 3

The procedure of Example 2 was repeated but using 1 g ELVAX 170 in place of the ELVAX 40-W. The solution of ELVAX in TPM was heated for 24 hours at 120° C. and was still cloudy when added to the slurry of the Cromophtal 8G. After being let down to 50 ml with more TPM this ink also gave very good dots, and had a viscosity of 80 to 30 cps at shear rates of 8 to 80 $sec^{-1}$ and was stable.

EXAMPLE 4

4 g Acryloid DM-55 were dissolved in 17 ml of dry, warm (50°–60° C.) TPM by stirring for 1 hour. To this solution was added 2.5 g Heliogen Blue L 6700 (BASF) and the slurry so obtained was stirred at 55° C. 1 g Vynathene 90500 dissolved in 10 ml TPM by stirring at 60° C. was then added to the slurry and the whole stirred for 24 hours at 60° C. It was then allowed to cool and diluted to 50 ml with more TPM.

This ink showed Newtonian behaviour from 300 to 3000 $sec^{-1}$ with a viscosity of 43 cps at these shear rates. The ink showed no tendency to settle, even after standing for over 2 months and gave print dots of excellent definition and colour density. By way of comparison, an ink having the same composition but excluding the Acryloid DM-55 would show signs of separation within a short period of time and also signs or gelling. Print from an ink having the same composition but excluding the Elvax 40-W would have poorer definition with a tendency to wick through the paper.

EXAMPLE 5

2.65 g Acryloid DM-55 were dissolved in 16 ml dry TPM at 60° C. by stirring for 1 hour. 1.5 Irgalite Red RBS (Ciba Geigy) was added and slurried at 60° C. for over 4 hours. To this slurry was added a warm solution obtained by dissolving 0.85 g ELVAX 40-W in 10 ml dry TPM at about 100° C. The resultant slurry was stirred for 72 hours at 60° C., and was then cooled and let down to 50 ml with more TPM. The resultant ink had a viscosity of 14 cps at a shear rate of 3000 $sec^{-1}$, showed very little tendency to settle over a period of more than 2 months and gave dots of good optical density.

EXAMPLE 6

To 20 ml dry TPM at 60° C. were added 4 g Acryloid DM-55 and the resultant mixture was stirred for 30 minutes to form a solution.

2 g Heliogen Blue L 6700 (BASF) were added and the resultant dispersion stirred for 16 hours at 60° C. While stirring the dispersion was cooled to room temperature, then stirred at room temperature for 1 hour and then reheated to 60° C. while stirring. 1 g ELVAX 40-W was then added and the mixture stirred at 60° C. for a further 72 hours. It was then cooled to room temperature and let down to 50 ml with more TPM. This ink had a viscosity of 22 cps at a shear rate of 3000 $sec^{-1}$, gave good dots on bond paper and was stable.

EXAMPLE 7

The procedure of Example 6 was repeated using 1.75 g Irgalite Red RBS (Ciba Geigy) in place of the Heliogen Blue, and then stirring for 4 hours before reducing the temperature to 60° C. This ink, after being let down to 50 ml, had a viscosity of 26 cps at a shear rate of 3000 $sec^{-1}$ and gave excellent dots on bond paper. The ink showed very little settling with time.

EXAMPLE 8

The procedure of Example 7 was repeated but using 2 g carbon black N234 (Witco) as dyestuff. The resultant ink had a viscosity of 19 cps at a shear rate of 3000 $sec^{-1}$, gave good dots, and did not settle on standing.

EXAMPLE 9

To a solution of 2.5 g of Copal A in 12 ml of TPM were added 12 ml of dry TPM and 1.5 g Irgalite Red, RBS (Ciba Geigy). The resultant slurry was heated to 60° C., stirred for 4 hours at 60° C., allowed to cool to room temperature while stirring and then reheated to 60° C. while stirring. A solution of 1 g ELVAX 40-W in 10 ml TPM was added to the resultant slurry and the mixture stirred overnight, and then cooled and let down to 50 ml with more TPM.

The resultant ink gave good dots, has a viscosity of 25 cps at 3000 $sec^{-1}$ shear rate, and showed little or no tendency to settle.

EXAMPLE 10

The procedure of Example 9 was used with a solution of 3 g Beckacite (Reichhold) in 20 ml TPM in place of the Copal A solution. The ink produced had a viscosity of 26 cps at 3000 $sec^{-1}$ shear rate, gave good dots, and also showed little or no tendency to settle.

Print from the black, red and blue inks of Examples 1 and 4 to 10 above exhibited optical reflection densities in the range 1.4 to 1.65.

EXAMPLE 11

0.5 g Vynathene 90500 and 2 g Acryloid DM-55 was dissolved in 20 ml of dry TPM by stirring and heating to 60° C. While at this temperature and with continued stirring 1.75 g of N330 carbon black (Witco) were added and stirred for 48 hours. A warm (60°–80° C.) solution of 1.6 g ELVAX 40-W in 10 ml of TPM was then added and the resultant mixture stirred for 6 hours, allowed to cool, and diluted to 50 ml with more TPM. The resultant ink was non-Newtonian in viscosity, gave well defined dots of good optical density, and did not settle on standing.

EXAMPLE 12

1 g Vynathene 90500 and 2 g Acryloid DM-55 were dissolved in 20 ml dry TPM in the manner described in Example 11. 2 g Heliogen Blue 6700 (BASF) was added and the mixture stirred warm for 8 hours. Then 1.75 g ELVAX 40-W as a solution in 10 ml TPM was added and the resultant slurry stirred warm for 8 more hours, cooled, and diluted to 50 ml with more TPM. The resultant ink was non-Newtonian, gave very good dots, and did not show any settling in 4 days.

EXAMPLE 13

0.5 g cellulose acetate butyrate 500.1 (Eastman) and 1 g Acryloid DM-55 were dissolved in 20 ml warm dry TPM. 1.6 g Irgalite Red RBS (Ciba Geigy) were then added and the mixture stirred for 4 hours. A solution of 1.6 g ELVAX 40-W in TPM was then added and the whole stirred for 6 hours, allowed to cool and let down to 50 ml with TPM. The resultant ink was non-Newtonian, gave very good dots, and did not settle on standing.

EXAMPLE 14

A black ink was prepared by dissolving 4 g of Acryloid DM 55 in 20 ml of warm (50°–60° C.) water-free tripropylene glycol monomethyl ether (TPM) while stirring and then, while maintaining the temperature and with additional stirring adding 2 g of N330 carbon black (Witco). To the mixture so formed was added a warm (60°–80° C.) solution of 1.75 g of Elvax W in 10 ml of TPM and the whole was stirred for a further 72 hours and then allowed to cool and diluted to 50 ml with more TPM.

Red and blue inks were also prepared. The red ink was prepared following the same procedure as that of the black ink but using 2 g of Acryloid DM 55, 2 g of Elvax W and, as the dyestuff, 1.8 g of Irgalite Red 2BX RBS (Ciba Geigy). The blue ink was prepared following the same procedure and using the same quantities of materials as for the red ink but using 2 g of Heliogen Blue L6700 (BASF) as the dyestuff.

All the inks of this Example demonstrate shear thinning.

EXAMPLE 15

An ink was prepared from TPM and containing 5% by weight of Mogul L carbon black (obtained from Cabot Corporation) and 9% by weight of EFka 47EA. In this composition, it was found by experiment that the minimum viscosity was obtained at concentration of the EFka 47EA of 2.5%±0.5%. Thus, this Example illustrates the use of the EFka as both dispersant and binder, with about 6.5% providing the binder function. The viscosity of the ink was 22 cPs at 12 rpm, measured on a Brookfield LV viscometer. Dots formed from the ink had a well defined edge.

I claim:

1. An ink jet ink composition for use in an ink jet printer comprising a suspension in
   (a) a non-aqueous solvent of (b) a disperse phase comprising:
      (i) a water-insoluble dyestuff which is insoluble in said solvent at the ink jet printer operating temperature and below;
      (ii) as dispersant for the dyestuff an amount of water-insoluble resin which is soluble in said solvent at the ink jet printer operating temperature; and,
      (iii) a polymeric binder to hold the dyestuff on the surface of paper, said binder being different from said dispersant and selected from the group consisting of ethylene/vinyl acetate copolymers, amino resins, polyvinyl butyrals, nitrocellulose, and polyisobutylene;
   wherein said dispersant is selected from resins other than ethylene/vinyl acetate copolymers, amino resins, polyvinyl butyrals, nitrocellulose, and polyisobutylene.

2. A composition as claimed in claim 1 in which the solvent has an evaporation rate at 25° C. and atmospheric pressure less than one-tenth that of butyl acetate, a viscosity not exceeding 20 cps at 25° C. when measured using a Brookfield LV Viscometer with a No. 1 spindle at a shear rate in the range 8 $sec^{-1}$ to 80 $sec^{-1}$, a surface tension in the range 27 to 32 dynes/cm at 25° C. and a boiling point above 150° C.

3. A composition as claimed in claim 1 wherein the solvent consists essentially of at least one ether selected from the group consisting of ethers of alkylene glycols and ethers of polyalkylene glycols.

4. A composition as claimed in claim 3 wherein said at least one ether is selected from the group consisting of monomethyl ethers of dipropyleneglycol and tripropylene glycol and n-butyl ethers of diethylene glycol and triethylene glycol.

5. A composition as claimed in claim 1 wherein the dispersant is one which will precipitate from a solution thereof in the chosen solvent on contact with plain paper.

6. A composition as claimed in claim 1 wherein the dispersant is one which is precipitated from solution in the chosen solvent by the contact with water.

7. A composition as claimed in claim 1 wherein the dispersant is selected from the group consisting of natural resins, synthetic resin esters, alcohol-soluble polyaccharides, and acrylic resins.

8. A composition as claimed in claim 1, in which the binder is insoluble or substantially insoluble in the solvent at ambient temperature but at least partly soluble in said solvent at the ink jet printer operating temperature.

9. A composition as claimed in claim 1 in which a solution of the binder in the solvent has a cloud point above room temperature.

10. A composition as claimed in claim 1 in which the binder is selected from the group consisting of ethylene/vinyl acetate copolymers containing 40 to 50% by weight vinyl acetate.

11. A composition as claimed in claim 1 wherein the disperse phase is precipitated by contact of the ink with water.

12. A composition as claimed in claim 1 wherein the disperse phase is precipitated by contact of the ink with plain paper.

13. A composition as claimed in claim 1 wherein the dyestuff is selected from the group consisting of pigment dyes.

14. A composition as claimed in claim 1 wherein the dyestuff has a particle size of 0.5 µm or less.

15. A composition as claimed in claim 1 containing from 2 to 5% by weight of dyestuff.

16. A composition as claimed in claim 1 containing from 2 to 12% by weight of dispersant.

17. A composition as claimed in claim 1 containing from 1 to 4% by weight of binder.

18. A composition as claimed in claim 1 containing from 84% to 93% by weight of solvent.

19. A composition as claimed in claim 1 wherein the dispersant is employed in an amount less than that required to achieve the minimum viscosity for dispersion thereof with the dyestuff and solvent, and the binder is employed in the amount to provide a part of the function of the dispersant.

20. A composition as claimed in claim 1 wherein the dispersant is employed in the amount in excess of that which yields the minimum viscosity for the dispersion thereof with the dyestuff of solvent, the excess amount providing a part of the function of the binder.

21. An ink jet composition for use in an ink jet printer comprising a suspension in (a) a non-aqueous solvent of (b) a disperse phase comprising:
   (i) a water-soluble dyestuff which is insoluble in said solvent at the ink jet printer operating temperature and below; and,
   (ii) as dispersant for the dyestuff an amount of water-insoluble resin which is soluble in said solvent at the ink jet printer operating temperature and which is present in an amount in excess of that which yields the minimum viscosity for the dispersion thereof with the dyestuff and solvent, the excess amount providing the function of a binder to hold the dyestuff on the surface of the paper.

22. An ink jet composition for use in an ink jet printer comprising a suspension in
   (a) tripropylene glycol monomethyl ether, said ether comprising 84 to 93 wt. % of said composition, of
   (b) a disperse phase comprising:
      (i) 2 to 5 wt. % of said composition of a water-insoluble dyestuff which is insoluble in said solvent at the ink jet printer operating temperature and below;
      (ii) as dispersant for the dyestuff, 2 to 12 wt. % of said composition of an acrylic resin having a cloud point in said solvent below ambient temperature, said acrylic resin being soluble in said solvent at the ink jet printer operating temperature; and,
      (iii) 1 to 4 wt. % of said composition of at least one ethylene/vinyl acetate copolymer containing 40 to 50 wt. % vinyl acetate, said ethylene/vinyl acetate copolymer acting as a binder to hold the dyestuff on the surface of paper; and,
   (c) 0 to 2 wt. % water;
   said (a)+(b)+(c) totaling 100 wt. %.

* * * * *

UNITED STATES PATENT AND TRADEMARK OFFICE
CERTIFICATE OF CORRECTION

PATENT NO. : 5,663,217
DATED : SEPTEMBER 2, 1997
INVENTOR : JURGEN M. KRUSE

It is certified that errors appear in the above-identified patent and that said Letters Patent is hereby corrected as shown below:

Column 4, line 29, please delete "not" and insert --now-- in lieu thereof.

Column 5, line 1, please delete "either" and insert --ethers-- in lieu thereof.

Signed and Sealed this

Twenty-fourth Day of February, 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO.   : 5,663,217
DATED        : September 2, 1997
INVENTOR(S)  : Jurgen M. Kruse It is certified that error appears in the above-identified patent and that said Letters Patent is hereby corrected as shown below:

Column 14,
Line 28, please change "An ink jet composition" to -- An ink jet ink composition --.
Line 31, please change "a water-soluble" to -- a water-insoluble --.

Signed and Sealed this

Twenty-second Day of October, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO.    : 5,663,217
DATED         : September 2, 1997
INVENTOR(S)   : Jurgen M. Kruse It is certified that error appears in the above-identified patent and that said Letters Patent is hereby corrected as shown below:

Column 14,
Line 28, please change "An ink jet composition" to -- An ink jet ink composition --.
Line 31, please change "a water-soluble" to -- a water-insoluble --.

Signed and Sealed this

Twenty-ninth Day of October, 2002

Attest:

JAMES E. ROGAN
Attesting Officer                Director of the United States Patent and Trademark Office